(12) United States Patent
Jansen et al.

(10) Patent No.: US 11,551,862 B2
(45) Date of Patent: Jan. 10, 2023

(54) ELECTRIC FIELD REDUCING INSULATING LAYER FOR AN INDUCTIVE COIL

(71) Applicant: PRODRIVE TECHNOLOGIES INNOVATION SERVICES B.V., Son (NL)

(72) Inventors: Jacob Willem Jansen, Son (NL); Nilles Henricus Vrijsen, Son (NL)

(73) Assignee: PRODRIVE TECHNOLOGIES INNOVATION SERVICES B.V., Son (NL)

(*) Notice: Subject to any disclaimer, the term of this patent is extended or adjusted under 35 U.S.C. 154(b) by 0 days.

(21) Appl. No.: 17/272,926

(22) PCT Filed: Sep. 3, 2019

(86) PCT No.: PCT/EP2019/073417
§ 371 (c)(1),
(2) Date: Mar. 2, 2021

(87) PCT Pub. No.: WO2020/053026
PCT Pub. Date: Mar. 19, 2020

(65) Prior Publication Data
US 2021/0202166 A1    Jul. 1, 2021

(30) Foreign Application Priority Data

Sep. 14, 2018  (NL) ........................ 2021631

(51) Int. Cl.
*H01F 27/28* (2006.01)
*H01F 38/14* (2006.01)

(52) U.S. Cl.
CPC ......... *H01F 38/14* (2013.01); *H01F 27/2804* (2013.01)

(58) Field of Classification Search
CPC ...... H01F 38/14; H01F 27/2804; H01F 27/36; H01F 27/2871; H01F 27/40; H01F 27/38;
(Continued)

(56) References Cited

U.S. PATENT DOCUMENTS

2012/0161535 A1* 6/2012 Jung .................. H01F 38/14
307/104

FOREIGN PATENT DOCUMENTS

| EP | 3133616 A1 * | 2/2017 |
| EP | 3133616 A1 | 2/2017 |
| WO | 2013120710 A2 | 8/2013 |

OTHER PUBLICATIONS

International Search Report and Written Opinion of the International Searching Authority from the European Patent Office, in PCT/EP2019/073417 dated Sep. 3, 2019, which is an international application corresponding to this U.S. application.

* cited by examiner

*Primary Examiner* — Lincoln D Donovan
*Assistant Examiner* — Alex W Lam
(74) *Attorney, Agent, or Firm* — Kolitch Romano Dascenzo Gates LLC

(57) ABSTRACT

An electric field-reducing insulating layer is described for an inductive coil. In some examples, a first coil having at least one first winding is arranged for being driven at a first voltage. A solid insulating layer is adjacent the first coil and has a first surface facing the first coil. The first surface of the solid insulating layer has a first groove between the first winding and the insulating layer, having a width that is smaller than a diameter of the electrical wire. The first groove forms a pocket between the first winding and the solid insulating layer.

20 Claims, 5 Drawing Sheets

(58) Field of Classification Search
CPC .... H01F 27/025; H01F 27/366; H01F 27/288; H01F 27/28; H01F 27/22; H01F 2027/2809; H02J 50/70; H02J 50/20; H02J 50/40; H02J 7/02; H02J 50/10; H02J 50/12; H02J 50/005; H02J 50/80; H02J 50/27; H02J 7/0042
See application file for complete search history.

ELECTRIC FIELD REDUCING INSULATING LAYER FOR AN INDUCTIVE COIL

TECHNICAL FIELD

The present disclosure is related to insulating structures, such as layers or trays, which may additionally support inductive coils. In particular, the present disclosure is related to such structures which support inductive coils of a contactless power transfer device.

INTRODUCTION

Contactless electrical energy transfer units generally comprise a power transmit coil arranged to transmit an electromagnetic field towards one or more electrical energy reception units. These reception units comprise a power reception coil that is arranged to generate electrical energy from the electromagnetic field to which it is exposed. However, this energy can also be received by other objects (e.g. living, conducting), which may pose a safety risk. Therefore, these power transfer units may comprise object detection systems as a safety feature. This is of particular interest in situations where the generated electromagnetic field is of considerable strength. This is typically the case in situations where the level of transferred power is high, such as the wireless charging of electric vehicles. These object detection systems generally comprise one or more object detection coils that are arranged to measure changes in parameters of an electromagnetic field. This electromagnetic field may be generated by the one or more object detection coils or a dedicated object detection field generation coil. Alternatively, object detection systems may detect objects by measuring capacitance using a conductive capacitive layer. In the following, the above kinds of object detection systems are referred to as an object detection layer within the contactless energy transfer unit. In addition, or alternatively, one or more positioning coils may be provided, which are used to sense a position of one unit (transmit unit or reception unit) relative to the other unit.

In known transfer units, the object detection layer, the positioning coil(s), and the power transmit coil are stacked on one another. By way of example, it is known from WO 2013/120710 to provide a resonator coil support plate having on one side grooves that accommodate the windings of the power transfer coil. On the opposite side of the support plate, grooves are provided that accommodate positioning coils. The positioning coils are used to detect a relative position between the transmit unit and the reception unit of a contactless power transfer system.

The object detection layer and the positioning coil(s) are typically driven with low voltage, whereas a high voltage is applied to the power transfer coil. Therefore, a high voltage insulation system must be provided between the two. The high voltage insulation system must be designed so as to prevent the deterioration of the insulation material over its lifetime due to partial discharge (PD). The most trivial method of preventing the occurrence of partial discharge is the reduction of the electric field strength by increasing the distance between the high voltage (HV) power transfer coil and the low voltage (LV) layer(s) and/or by providing additional insulating material with a low electric permittivity between the two. Such straightforward solutions sometimes are not possible due to dimensional constraints and economic considerations.

SUMMARY

The present disclosure provides a device which overcomes the above mentioned drawbacks. In particular, aspects of the present disclosure provide a device which can be mounted/included in a power transfer device and which allows for effectively reducing a peak electromagnetic field strength for a same build-up height and/or for a same material choice. Aspects of this disclosure provide a power transfer device which has a longer lifetime, in particular as concerns the electrical insulation material.

In devices according to aspects as described herein, a solid insulating layer is provided adjacent a first coil. The solid insulating layer can be stacked between the first coil and a second layer. The second layer can comprise or be formed of a second coil. The first and second coils are advantageously driven at different voltages. By way of example, the first coil can be driven at a high voltage (e.g., at least 700 V peak). The second coil can be driven at a low voltage (e.g., 125 V peak). Alternatively, or in addition, the second layer can comprise or consist of an electrically conductive material, such as an electrode layer, a ferrimagnetic material such as ferrite, a ferromagnetic material, or a semiconducting material. The second layer can be configured to be at low electric potential, such as at or near ground potential, e.g. between 0 V and 125 V, or between 0 V and 50 V. Even when the second layer is only slightly electrically conductive, electric charge can nonetheless concentrate on a surface of these materials due to the vicinity of the magnetic field of the first coil. The electric charge can give rise to partial discharge in the solid insulating layer.

In some embodiments, a groove is provided on a surface of the solid insulating layer facing the first coil. The groove is hence interposed between the winding(s) of the first coil and the insulating layer, and advantageously extends such that it follows the winding(s) of the coil and is positioned in alignment with the winding, in particular aligned with a centerline of the winding electrical wire. The groove has a width smaller than a diameter of the winding electrical wire, hence preventing the winding wire to be substantially accommodated in the groove. As a result, the groove remains substantially void of the conducting wire. As the winding wire does not fit in the groove, a pocket is created between the winding wire and the solid insulating layer, which can be filled with an insulating fluid, such as air. Alternatively, a material of lower electric permittivity than the solid insulating layer can be arranged in the groove (pocket), or the pocket can be vacuum. A second, similar groove can be provided in a surface of the solid insulating layer facing the second coil.

In one particular embodiment, the windings of at least one inductive coil are arranged in tracks provided in a tray. Preferably, the tracks are arranged as a guide for the windings of the coil, because this simplifies reliably and reproducibly manufacturing the coil in a cost effective way and ensures the shape of the windings is retained. Beneficially, the size and/or shape of the tracks are arranged for clamping the windings. The groove can be provided in the bottom of the tracks, underneath the coil windings. Beneficially, the tracks are arranged to fix the position of the windings with respect to the grooves.

It has been observed that in a flat solid insulating layer which is in proximity to the coil windings, the electromagnetic field peaks at those spots, where the distance between the solid insulating layer and the coil winding is shortest. By locally replacing solid insulating material with air or a material with a lower electric permittivity than the solid insulation layer, e.g. by removing material and providing a groove instead, it was observed that the peak value of the electromagnetic field could be reduced by 25%. This substantially reduces risk on partial discharge occurrence and therefore increases lifetime of the overall device.

Advantageously, the edges of the groove are rounded or bevelled. This is particularly advantageous where the windings are in contact with the solid insulating layer. In such case, the point of contact between windings and solid insulating layer will be at the edges of the groove. More precisely, the surface of the solid insulating layer at the point of contact is advantageously tangential to the surface of the coil winding. Preferably, the distance between points of contact at opposite edges of the groove (i.e. at locations where the surface contacts the coil winding) is as large as possible.

BRIEF DESCRIPTION OF THE DRAWINGS

Aspects of the present disclosure will now be described in more detail with reference to the appended drawings, wherein same reference numerals illustrate same features.

DETAILED DESCRIPTION

Figure 1:
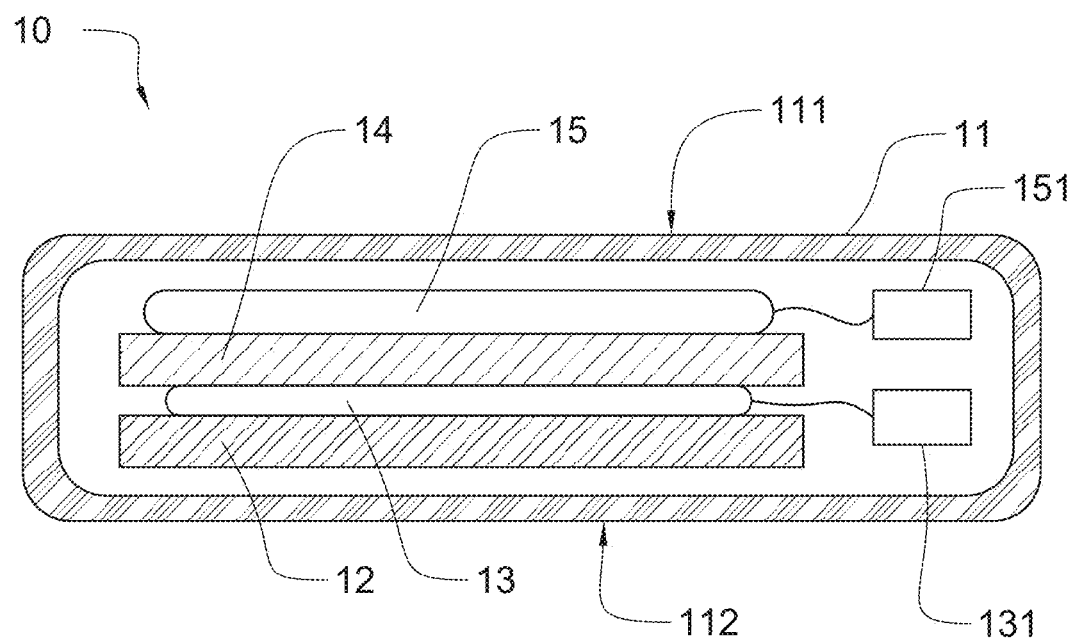
FIG. 1 represents a cross section of a power transfer device according to aspects of the present disclosure.

Referring to FIG. 1, a power transfer device 10 generally comprises a housing 11. The housing 11 has a top external surface 111 and a bottom external surface 112, arranged opposite the top surface 111. In FIG. 1 power transfer device 10 is shown as a ground assembly for charging a vehicle, configured to be mounted with the bottom surface 112 on a floor. However, when FIG. 1 is turned upside down, a configuration is obtained for a power reception unit, for mounting on a vehicle. It will therefore be convenient to note that the description below applies both to power transmission and to power reception units.

A power transfer coil 15 is arranged within housing 11. The power transfer coil 15 is typically connected to a driver 151, which may be arranged inside or outside the housing 11, and which is configured to apply a high alternating voltage to the power transfer coil. Voltage levels of at least 700 $V_{RMS}$, advantageously at least 800 $V_{RMS}$, advantageously between 1000 $V_{RMS}$ and 2500 $V_{RMS}$ can be used. In the remainder, the power transfer coil 15 will be referred to as the HV (high voltage) coil. The HV coil is configured to inductively transfer power across the top surface 111 with a remotely arranged power transfer coil (not shown).

A second coil 13 is arranged within housing 11. The second coil 13 is advantageously connected to a circuit 131, which can be a driver and/or sensing circuit, and which is configured to apply a low alternating voltage to the coil 13. Voltage levels of 400 $V_{RMS}$ or less, advantageously 300 $V_{RMS}$ or less, advantageously 250 $V_{RMS}$ or less, advantageously between 200 $V_{RMS}$ and 5 $V_{RMS}$ can be used. The circuit 131 may be configured to detect objects on the basis of the magnetic field generated by coil 13 or to detect a position relative to a (foreign) object, such as a vehicle, for alignment, for pairing, or for any other useful application. The coil 13 will be referred to as the LV (low voltage) coil.

Underneath the LV coil 13, a layer 12 of a ferrite material is provided. The ferrite material is advantageously a soft-magnetic ferrite or other suitable magnetic (e.g. ferromagnetic or ferrimagnetic) material. The ferrite material is advantageously used to improve magnetic coupling between the HV coils of the transmission side and of the reception side. Therefore, it is advantageous to choose a composition that has low losses at the power transfer frequency of interest (e.g. <500 kW/m$^3$ at 100 kHz, 200 mT and 25° C.). Typically, power transfer frequencies range between 20 kHz and 100 kHz for automotive applications. The ferrite material is advantageously connected to earth.

Electrical insulation 14 must be provided between the HV coil 15 and the LV coil 13 for insulating the high voltage components (HV coil 15) from the low voltage components, such as the LV coil 13 and from ground. The order in which the coils 13 and 15 are stacked is not particularly important, e.g. they may be turned upside down.

Figure 2:
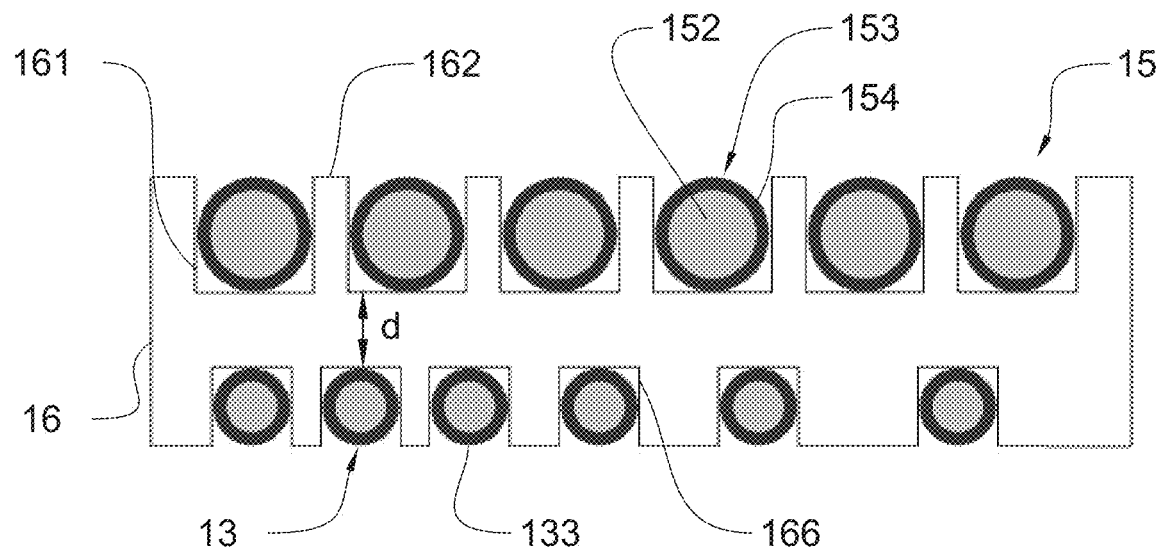
FIG. 2 represents a cross section of a tray for comprising tracks for accommodating coil windings of a first coil and a second coil according to the prior art.

Referring to FIG. 2, the windings 153 of the HV coil 15 are typically arranged in a tray 16 which is provided with tracks 161 separated by uprights or ribs 162. The windings 153 of the HV coil 15 are made of electric wire comprising a conductor core 152 possibly surrounded with an electrically insulating sheath 154. The conductor core 152 of the windings of HV coil 15 may be made of any suitable electrically conductive material, such as copper or aluminium. The core can be single strand or multistrand, such as Litz wire.

The windings 133 of the LV coil 13 can be arranged in tracks 166 arranged in the same tray 16, on an opposite surface compared to tracks 161, or in a separate tray, which furthermore may be placed back-to-back against each other.

Figure 3:
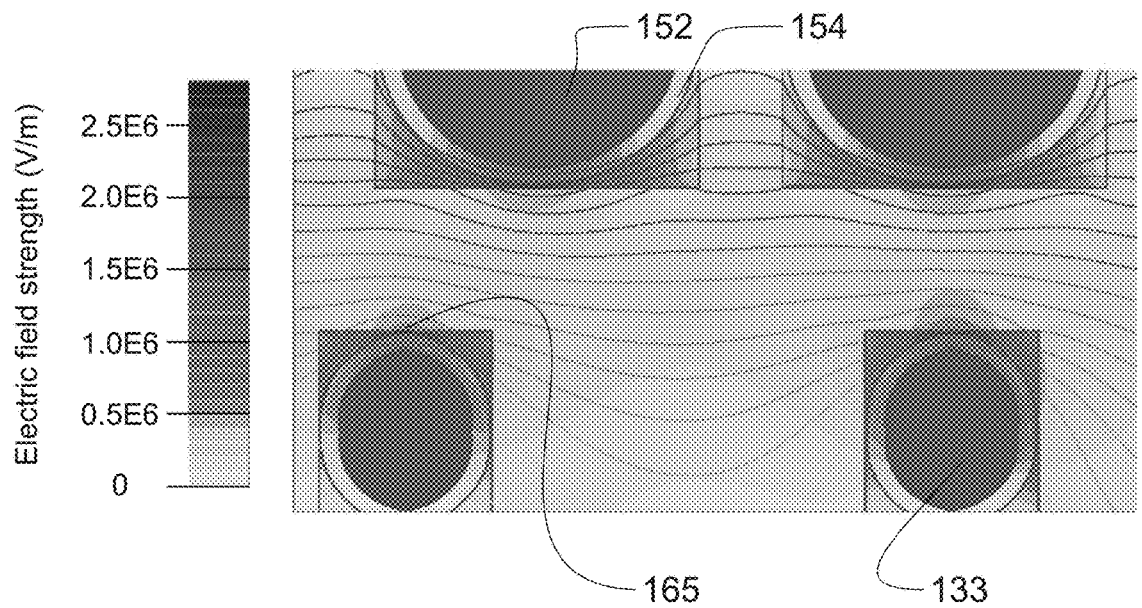
FIG. 3 represents simulation results of the electromagnetic field strength for the tray geometry of the prior art as presented in FIG. 2. The peak electromagnetic field strength was determined at 2.8 kV/mm at the point of contact between track bottom and the winding wire.

The spacing d between the tracks 161 and 166 forms a solid insulating layer between the HV coil 15 and the LV coil 13. Referring to FIG. 3, in such a configuration, it has been shown that electric field strength concentrations occur at the point of contact 165 between the windings of the coil(s) and the tray material.

Figure 4:
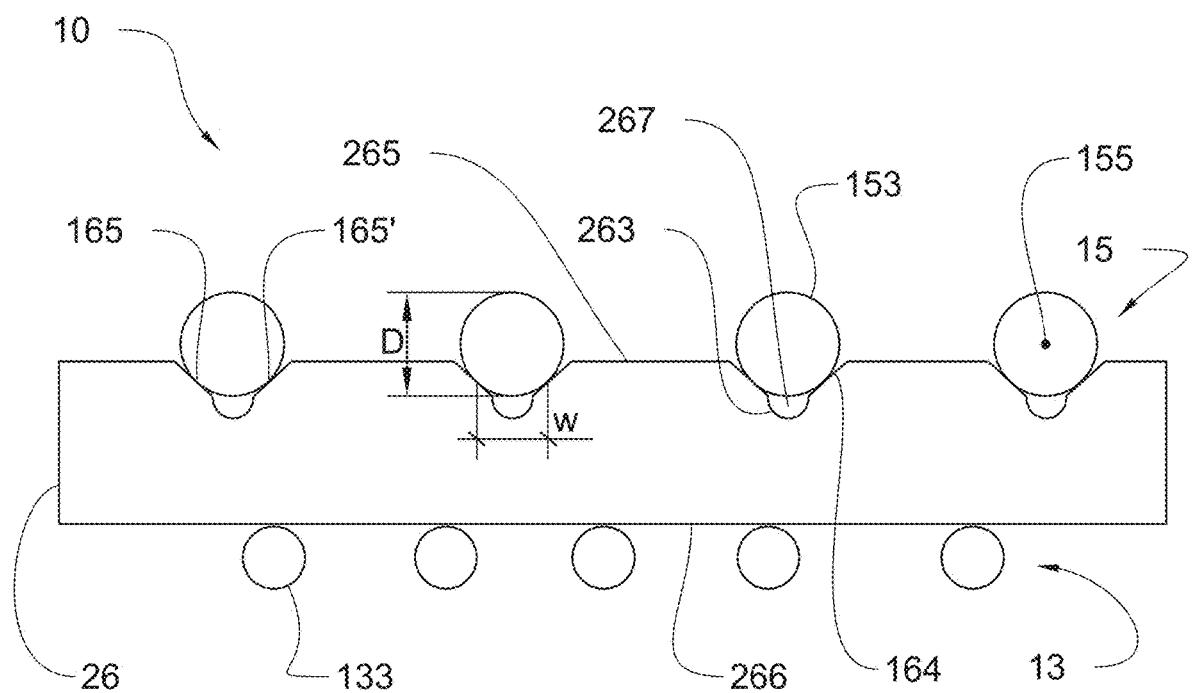
FIG. 4 represents a cross section of an embodiment according to aspects of the present disclosure, with a solid insulating layer separating the high voltage coil and the low voltage coil. Grooves are provided on the surface of the insulating layer facing the high voltage coil.

In order to reduce such field strength concentrations, in the present invention, grooves are provided in the surface of the solid insulating layer which is facing either one, or both HV coil 15 and LV coil 13. A most elementary embodiment of aspects of the present invention is shown in FIG. 4. A solid insulating layer 26 is interposed between the HV coil 15 and the LV coil 13. The coils may make contact with solid layer 26, but this is not a requirement. On surface 265 of solid layer 26 which is facing the HV coil 15, a groove 263 is provided, advantageously in alignment with the coil windings 153. The groove 263 hence follows the winding(s) 153 of coil 15. The groove 263 has width w which is advantageously smaller than a diameter D of the coil winding 153. Advantageously, the groove width w is smaller than or equal to 0.65 D, advantageously smaller than or equal to 0.5 D, advantageously smaller than or equal to 0.4 D. The groove width w is advantageously determined between two opposite points of contact 165, 165' between layer 26 and the coil winding 153. The grooves 263 form pockets 267 underneath the winding wire which advantageously remain void of solid material, and can be filled with an insulating fluid, which can be a liquid or a gas, such as air, or may alternatively be vacuum. Surprisingly, replacing solid material at the location of the grooves with an insulating fluid such as air significantly reduces electromagnetic field strength concentrations, and allows for reducing risk of occurrence of partial discharges at the solid insulating layer.

A minimum groove width w may depend on the diameter D of the coil winding 153. Advantageously, w is at least 0.15 D, advantageously at least 0.25 D. The diameter D refers to the diameter of the wire that makes up the winding, including the electrical conductor 152 and any possible insulating sheath(s) 154. Advantageously the groove 263 has a depth as determined from the surface 265 of at least 0.2 mm, advantageously at least 0.5 mm, advantageously at least 1 mm. In case the winding wire has a cross section different from circular, the size of the wire measured in a direction parallel to the groove width w, i.e. the wire width, can be taken as value for D.

Alternatively, or in addition, a similar groove can be provided on the opposite surface 266 which is facing the LV coil 13.

Figure 6:
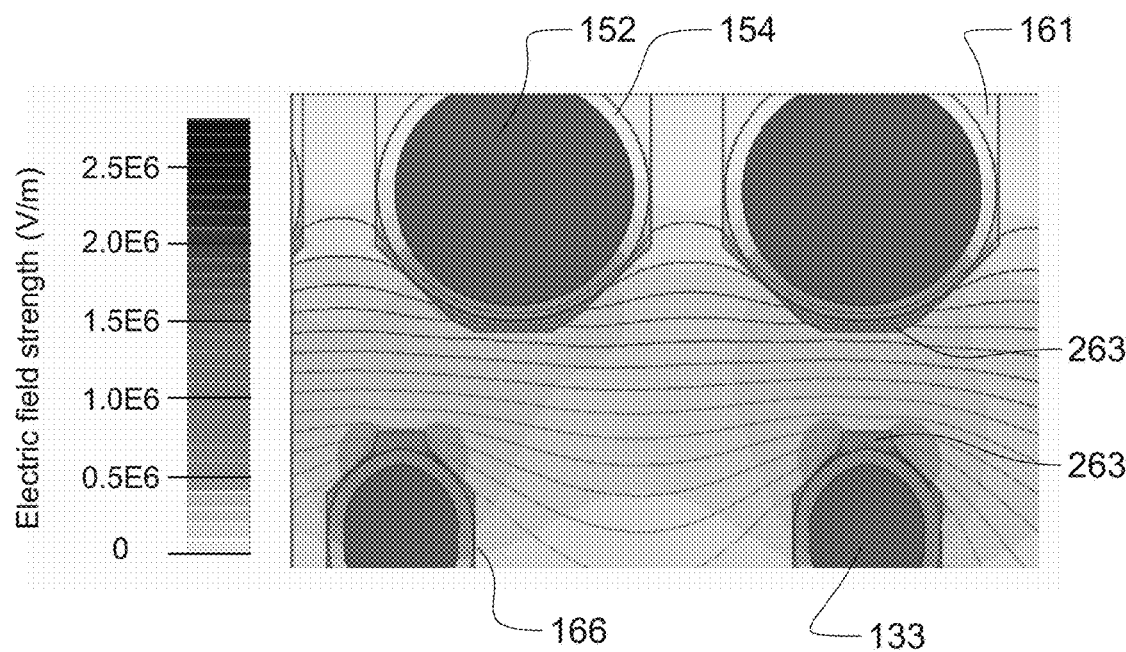
FIG. 6 represents simulation results of the electromagnetic field strength for the tray geometry of FIG. 5. The grooves form pockets filled with air. The peak electromagnetic field strength was determined at 2.1 kV/mm.

The grooves 263 are advantageously aligned with a centerline 155 of the respective coil winding to provide an air gap underneath the winding, precisely at those locations where a peak electromagnetic field strength is to be expected. Comparing the simulations shown in FIGS. 3 and 6, it becomes clear that by replacing tray material with air (or another fluid) at those locations where the electromagnetic field peaks, the peak field strength can be decreased by 25%.

Alternatively, the grooves 263 may be offset from the centerline 155 of the coil windings. A depth of the grooves may extend in a direction towards windings 133 of the other coil (e.g. the LV coil). Yet alternatively, in case the spacing between coil windings is different between the HV coil 15 and the LV coil 13 and/or variable, it may be advantageous to make the grooves sufficiently large so that the groove extends along a straight line between centrelines 155 of opposite coil windings of HV and LV coil.

The edges 164 of the grooves are advantageously bevelled (chamfered) or rounded. Advantageously, the surface of the groove 263 at the point of contact 165 with the coil winding 153 is locally substantially tangential to the external surface of the coil winding. The bevelled edge has a width advantageously at least 0.2 mm wide, advantageously at least 0.5 mm. The rounded edge has a radius advantageously at least 0.2 mm, advantageously at least 0.5 mm.

Figure 5:
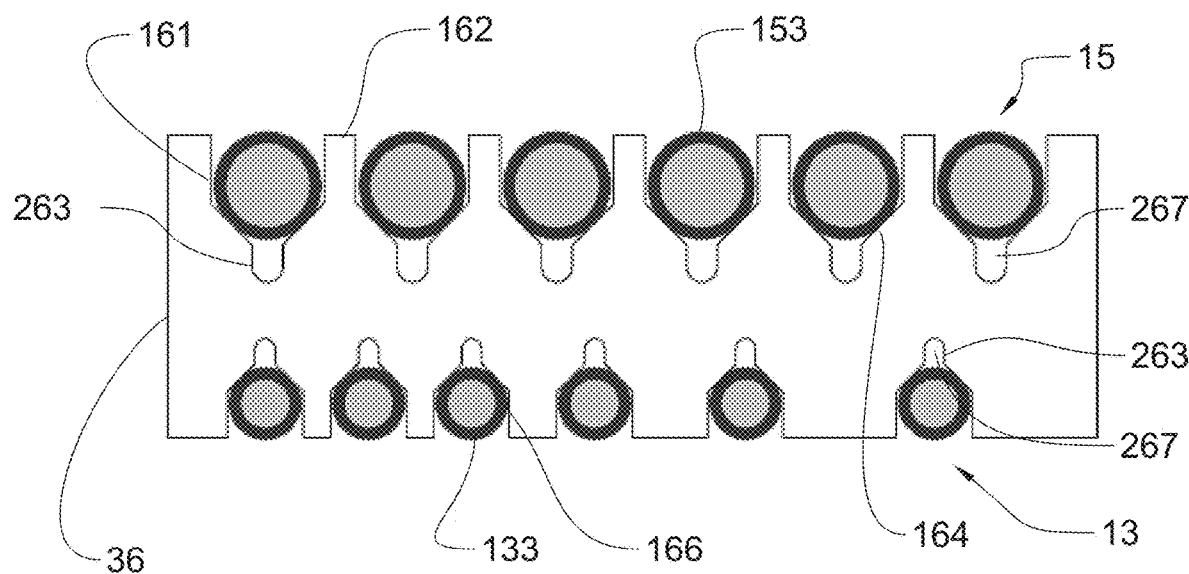
FIG. 5 represents a cross section of a tray comprising tracks accommodating coil windings and provided with grooves according to aspects of the present disclosure.

Referring to FIG. 5, in case the coils 15 and/or 13 are arranged in the tray 36, the groove 263 can conveniently be provided in the bottom of the tracks 161 of the HV coil 15 and/or in the bottom of the tracks 166 of the LV coil.

Figure 7:
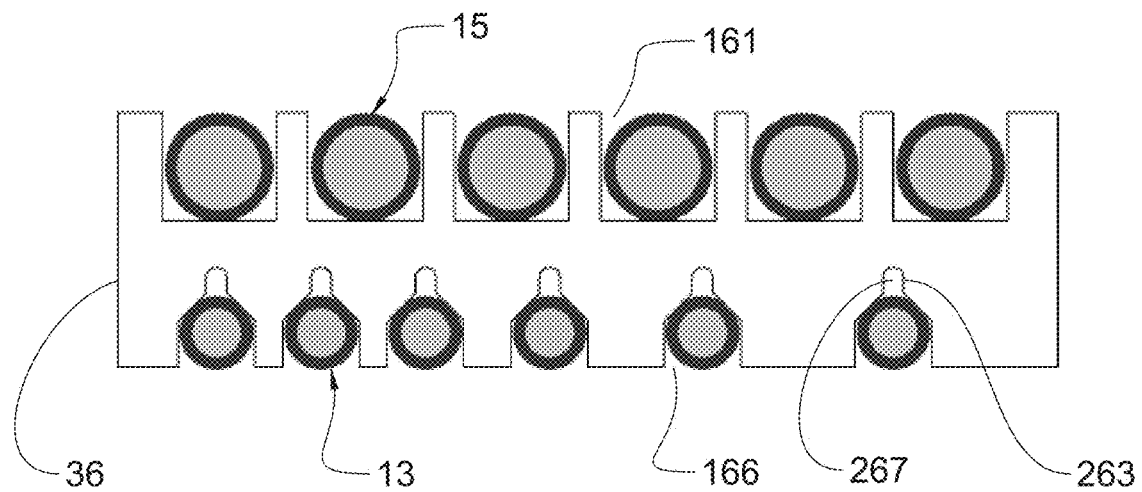
FIG. 7 represents a cross section of an alternative tray according to aspects of the present disclosure, in which grooves are provided in the bottom of the tracks of the LV coil only.
Figure 8:
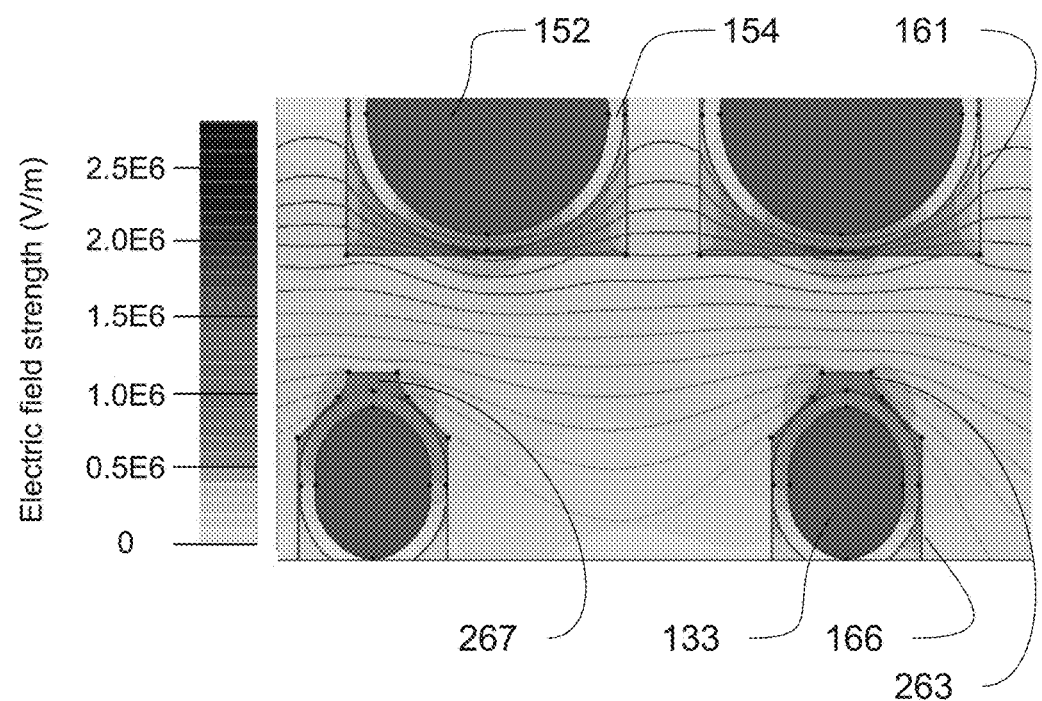
FIG. 8 represents simulation results of the electromagnetic field strength for the tray geometry of FIG. 7. The grooves form pockets filled with air. The peak electromagnetic field strength was determined at 2.1 kV/mm.

Referring to FIGS. 7 and 8, it is not required to provide the grooves at both HV and LV coils for obtaining significant electromagnetic field strength concentration reduction. The grooves 263 may be provided at the side of the LV coil 13 only, or alternatively at the side of the HV coil 15 only. Simulations shown in FIG. 8 indicate that a same reduction can be obtained.

Figure 9:
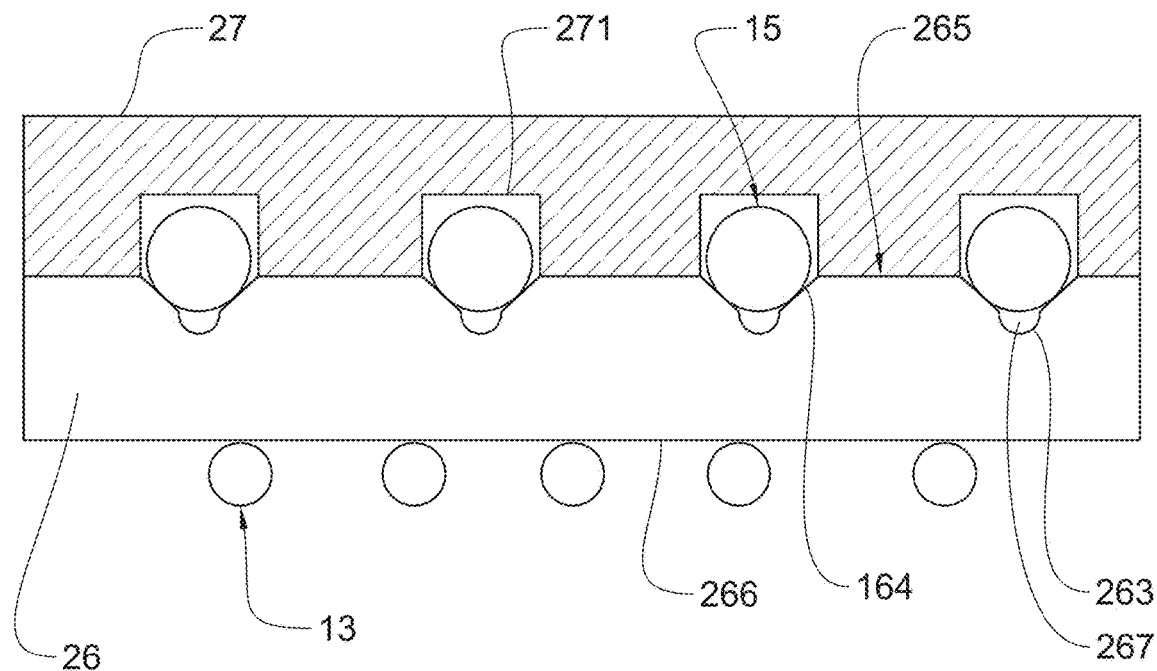
FIG. 9 represents a cross section as in FIG. 4, but with the high voltage coil windings being arranged in a tray placed upside down against the solid insulating layer.

Referring again to FIG. 4, it may be convenient to provide a separate tray or cover in which the windings of the coil 15 (and/or 13) are housed. As shown in FIG. 9, the tray 27 comprises tracks 271. The coil windings 15 may even be potted in the tracks 271 of tray 27. The tray can then be placed upside down against the solid insulating layer 26 separating the two coils 15 and 13, and the grooves 263 conveniently provided on the surface 265 of layer 26.

Figure 10:
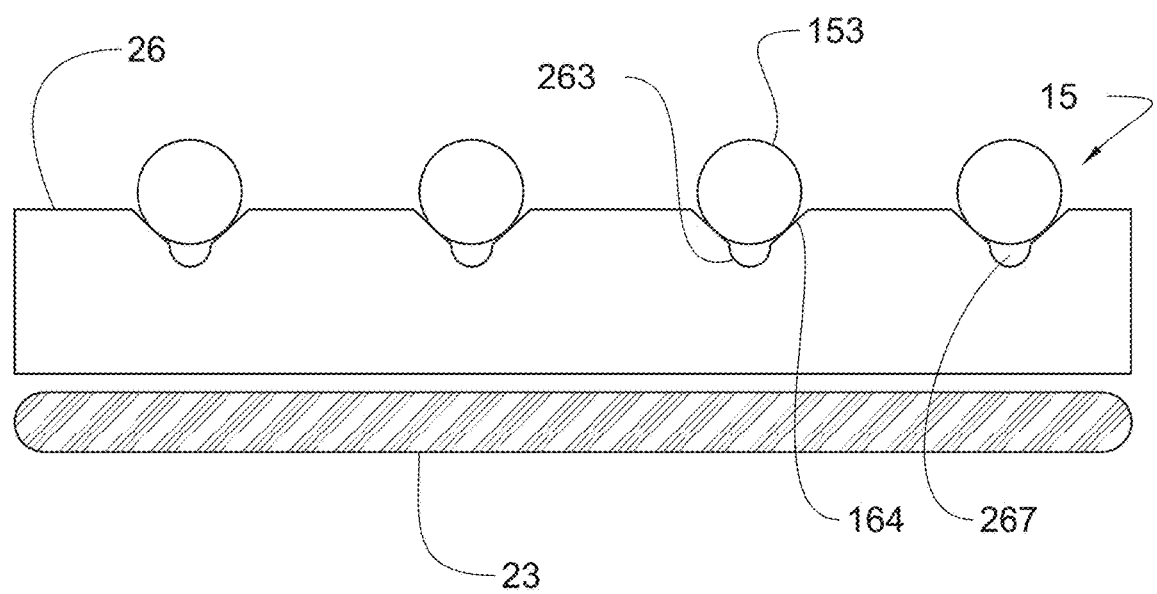
FIG. 10 represents a cross section as in FIG. 4, wherein the low voltage coil is replaced by a conductive layer, such as a capacitive sensing layer, or a ferrite layer configured to be at low electric potential, or electric ground.

Referring now to FIG. 10, in another embodiment according to aspects of the invention, the LV coil 13 is omitted, and the insulating layer 26 separated the HV coil 15 from a layer 23, which can be a capacitive sensing layer or a ferrite layer. Layer 23 typically is at low or ground electric potential. Also in these cases, providing grooves 263 underneath the coil windings 153 allows for reducing peak electromagnetic field strengths.

By reducing a peak electromagnetic field strength, a long lifetime of insulating material of tray 16 is ensured by preventing deterioration of the (solid) insulating material due to partial discharge.

The solid insulating layer is advantageously made of a material having a relative electric permittivity smaller than or equal to 8.

The invention claimed is:

1. A device, comprising:
a first layer including a first coil having at least one first winding of a first electrical wire, the first coil configured to be driven at a first voltage, and
a solid insulating layer adjacent the first layer, the solid insulating layer having a first surface facing the first coil and a second surface opposite the first surface,
wherein the first surface comprises a first groove between the at least one first winding and the solid insulating layer, the first groove having a width smaller than a diameter of the first electrical wire, wherein the first groove forms a pocket between the at least one first winding and the solid insulating layer.

2. The device of claim 1, wherein the first groove is a vacuum or is filled with a material having a lower electric permittivity than the solid insulating layer.

3. The device of claim 1, wherein an edge between the first groove and the first surface is bevelled or rounded.

4. The device of claim 3, wherein the at least one first winding makes contact with, or is supported by, the edge.

5. The device of claim 4, wherein at a point of contact between the at least one first winding and the solid insulating layer, the first surface is locally tangential to the first electrical wire.

6. The device of claim 1, further comprising a first tray-having tracks, wherein the at least one first winding is arranged in the tracks.

7. The device of claim 6, wherein the solid insulating layer comprises the first tray.

8. The device of claim 6, wherein the first tracks comprise a bottom surface, and wherein the first groove is provided in the bottom surface.

9. The device of claim 1, further comprising a second layer at least partially made of a material which in use is at a second voltage different from the first voltage, wherein the solid insulating layer is stacked between the first layer and the second layer.

10. The device of claim 9, wherein a peak value of a voltage difference between the first voltage and the second voltage is at least 700 V.

11. The device of claim 9, wherein the material in the second layer is selected from the group consisting of: an electrically conductive material, a ferrimagnetic material, a ferromagnetic material, and a semiconducting material.

12. The device of claim 9, wherein the second layer comprises a second coil comprising at least one second winding of a second electrical wire, the second coil configured to be driven at the second voltage.

13. The device of claim 12, wherein the second surface comprises a second groove between the second winding and the solid insulating layer, the second groove having a width smaller than a diameter of the second electrical wire, wherein the second groove forms a pocket between the second winding and the solid insulating layer.

14. The device of claim 13, further comprising a second tray having second tracks, wherein the second winding is arranged in the second tracks.

15. The device of claim 9, wherein the second layer comprises an electrode.

16. The device of claim 9, wherein the second layer comprises ferrite.

17. The device of claim 1, wherein the width (w) is smaller than or equal to 0.65 times the diameter (D).

18. A contactless power transfer device, comprising the device of claim 1, wherein the first coil is a power transfer coil, an object detection coil configured to detect foreign objects, or a positioning coil.

19. A contactless power transfer device, comprising the device of claim 1; and
further comprising a second layer at least partially made of a material which in use is at a second voltage different from the first voltage, wherein the solid insulating layer is stacked between the first layer and the second layer;
wherein the second layer comprises a second coil comprising at least one second winding of a second electrical wire, the second coil configured to be driven at the second voltage; and
wherein one of the first coil and the second coil is a power transfer coil, and wherein the other one of the first coil and the second coil is (a) an object detection coil configured to detect foreign objects, or (b) a positioning coil.

20. The device of claim 1, wherein the first groove is filled with a medium having a lower electric permittivity than the solid insulating layer, and wherein the medium is air.

* * * * *

UNITED STATES PATENT AND TRADEMARK OFFICE
CERTIFICATE OF CORRECTION

PATENT NO. : 11,551,862 B2
APPLICATION NO. : 17/272926
DATED : January 10, 2023
INVENTOR(S) : Jacob Willem Jansen and Nilles Henricus Vrijsen It is certified that error appears in the above-identified patent and that said Letters Patent is hereby corrected as shown below:

In the Claims

Column 6, Line 59, Claim 6: the text "tray-having" should read --tray having--.

Signed and Sealed this
Seventh Day of March, 2023

Katherine Kelly Vidal
*Director of the United States Patent and Trademark Office*